(12) United States Patent
Jemili et al.

(10) Patent No.: US 11,874,291 B2
(45) Date of Patent: Jan. 16, 2024

(54) METHOD FOR TEMPERATURE COMPENSATION OF A MICROELECTROMECHANICAL SENSOR, AND MICROELECTROMECHANICAL SENSOR

(71) Applicant: Robert Bosch GmbH, Stuttgart (DE)

(72) Inventors: Amin Jemili, Kusterdingen (DE); Jochen Reinmuth, Reutlingen (DE); Dusan Radovic, Stuttgart (DE); Rolf Scheben, Reutlingen (DE); Steffen Becker, Coswig (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/661,039

(22) Filed: Apr. 27, 2022

(65) Prior Publication Data
US 2022/0357356 A1 Nov. 10, 2022

(30) Foreign Application Priority Data

May 6, 2021 (DE) ...................... 10 2021 204 615.0

(51) Int. Cl.
*G01P 1/00* (2006.01)
*G01P 15/08* (2006.01)

(52) U.S. Cl.
CPC .............. *G01P 1/006* (2013.01); *G01P 15/08* (2013.01); *G01P 2015/0862* (2013.01)

(58) Field of Classification Search
CPC ..................................................... G01P 1/006
USPC ........................................................ 73/497
See application file for complete search history.

(56) References Cited

U.S. PATENT DOCUMENTS

| 2017/0122976 A1* | 5/2017 | Mitchell | ............... G01C 25/005 |
| 2017/0242048 A1* | 8/2017 | Sommer | .................. G01P 1/006 |
| 2020/0216305 A1 | 7/2020 | Rizzini et al. | |
| 2021/0214213 A1* | 7/2021 | Waldmann | ............ G01P 15/125 |

FOREIGN PATENT DOCUMENTS

| DE | 102018210111 A1 | 12/2019 |
| DE | 102019218334 A1 | 5/2021 |
| JP | 2019052883 A | 4/2019 |
| WO | 2021034453 A1 | 2/2021 |

\* cited by examiner

*Primary Examiner* — Walter L Lindsay, Jr.
*Assistant Examiner* — Philip T Fadul
(74) *Attorney, Agent, or Firm* — NORTON ROSE FULBRIGHT US LLP

(57) ABSTRACT

A method for temperature compensation of a MEMS sensor. The method includes: in a balancing step, a temperature gradient is produced by a thermal element and a first and a second temperature are determined at a first and a second temperature measurement point, wherein a deflection of a movable structure produced by the temperature gradient is measured and a compensation value is ascertained dependent on the first and second temperature and the deflection; in a measurement step, a physical stimulus is measured by way of a deflection of the movable structure and a third and fourth temperature is determined at the first and second temperature measurement points; in a compensation step, a measured value of the physical stimulus is ascertained dependent on the measured deflection, the third and fourth temperature and the compensation value. A method is also provided including: a regulation step, and a measurement step.

15 Claims, 2 Drawing Sheets

METHOD FOR TEMPERATURE COMPENSATION OF A MICROELECTROMECHANICAL SENSOR, AND MICROELECTROMECHANICAL SENSOR

CROSS REFERENCE

The present application claims the benefit under 35 U.S.C. § 119 of German Patent Application No. DE 10 2021 204 615.0 filed on May 6, 2021, which is expressly incorporated herein by reference in its entirety.

FIELD

The present invention relates to temperature compensation of a microelectromechanical sensor.

BACKGROUND INFORMATION

Microelectromechanical systems (MEMS), which are used as sensors for measuring physical variables such as acceleration, angular rate or pressure, are available in many different specific embodiments in the related art. In particular, in the case of the sensors used in the field of entertainment and consumer electronics, the technical development in this field is greatly determined by the two factors of increasing miniaturization and the constantly increasing accuracy requirements. MEMS sensors are frequently arranged, together with further components, on a printed circuit board, the other components giving off heat during operation and thereby imparting a relatively steep temperature gradient to the printed circuit board and hence to the sensor. Thus for example a temperature difference between the printed circuit board and the surroundings yields a vertical temperature gradient in the sensor, temperature differences along the printed circuit board yield a horizontal gradient, and in the event of temperature fluctuations over time, owing to the heat capacity and the thermal conductivity, a temperature gradient that runs mainly in the vertical direction, but at the same time also has a horizontal component, is yielded.

Microelectromechanical sensors such as for example inertial sensors mostly have a movable mass, by the deflection of which the physical variable to be determined is measured. Usually the movable structure for this purpose is enclosed in a cavity between two substrates, so that a defined gas atmosphere is created with which the damping of the movable mass necessary for high-precision sensors is produced. What is disadvantageous about such an arrangement is however that due to the gas in the case of a temperature gradient applied to the sensor additional forces on the movable mass may occur. These forces typically cannot be distinguished from the effect of the measured variable proper, and hence cause a sometimes considerable spurious signal. One possible cause of such an undesirable application of force is the contact of a surface with a gas that is at a higher or lower temperature than the surface itself. Under these circumstances, upon reflection of a gas particle on the surface the following energy and impulse transfer takes place: if the gas is at a higher temperature than the surface, in a statistical average kinetic energy is transferred from the particle to the surface, i.e., the particles after contact have a lower speed than previously. Upon contact, therefore (on average) less impulse is transmitted to the surface than in a case in which the surface and gas are at the same temperature. The gas thus exerts a slightly reduced pressure on the cooler surface. Conversely, i.e., if the surface is at a higher temperature, the surface on average loses more impulse to the particles and the pressure on the surface is increased accordingly.

Such effects lead to additional forces, which can distort the measurement result, being yielded in the case of sensors with movable structures. With the dimensions of the movable structure becoming ever smaller, even low forces lead to a large spurious signal in some circumstances. In order to reduce this influence, for example the gas pressure in the cavity can be reduced, as a result of which, however, the damping and hence the sensor performance is also reduced at the same time.

SUMMARY

An object of the present invention is to provide a method and a sensor with which an accurate measurement can be carried out, even with a temperature gradient applied to the sensor.

The method according an example embodiment of the present invention makes it possible, compared with the related art, to detect the influence of the temperature gradient on the deflection of the movable structure quantitatively and to correct the measured value accordingly. The basic feature here is based on forcing the temperature, and in particular the temperature gradient applied to the MEMS component, for balancing purposes and measuring it for compensation purposes, in order then to correct the measuring signal with a compensation value that is dependent on the measured temperature gradient, or with a plurality of such compensation values. The temperature gradient in this case is produced by way of at least one thermal element that brings about a local temperature increase or temperature reduction. Preferably the temperature gradient is produced by at least two or more thermal elements, which are spaced apart from one another and heat or cool different partial regions of the sensor. Preferably all of the thermal elements bring about heating, but it is however also possible for some of the thermal elements to serve for heating, while some others are used for cooling. The spatial temperature profile in the sensor can be controlled precisely by the at least two or more thermal elements. The thermal elements or at least one thermal element may in this case function in particular at the same time as temperature measurement elements, and in the following the term "thermal element" is always to be understood in this sense of a possible dual function. The sensor may have further temperature measurement points in addition to the first and second temperature measurement points, so the temperature profile can be determined with a correspondingly higher local resolution. The temperature difference between the first and second temperature measurement points in this case provides information about the temperature gradient produced by the thermal element. Preferably the deflection caused by the temperature gradient is measured only when a stable temperature profile has formed. In particular, for this purpose the measurement of the deflection may take place with a time delay relative to the activation of the thermal element. It is also conceivable here for the temperature development at the first and second temperature measurement points to be monitored and the measurement of the deflection to take place only when the first and second temperatures have assumed a stable value. The measurement of the deflection in this case preferably takes place without an external physical stimulus, i.e. under external conditions in which the deflection should ideally (i.e. without the additional influence of the temperature gradient) be zero. For ascertaining the compensation value, it can for example be assumed that the deflection is proportional to the temperature gradient, so that a compensation value can be ascertained already on the basis of a single measurement. Preferably, by the thermal element, gradients of different degrees are produced, the dependency of the deflection on the first and second temperature is measured, and the profile of this dependency is used to correct the measured value. The compensation value or compensation values may for example be provided by an amount (offset) that is dependent on the temperature gradient, this amount being deducted from each measured deflection in order to compensate for the measuring error.

In accordance with an example embodiment of the present invention, in order to separate the deflection brought about by the physical stimulus from the thermal influence, the third and fourth temperatures in the two measurement points are determined simultaneously together with the deflection. Thereupon, together with the third and fourth temperatures, the corrected measured value of the physical stimulus can be ascertained from the compensation value, which quantifies the influence of the temperature gradient. The stimulus may be for example an acceleration, an angular rate or a pressure, and the movable structure may for example be a mechanical resonator, in particular one or more elastically mounted seismic masses or a membrane. The influence of the temperature gradient on the movable structure depends greatly on the geometry and nature of the microelectromechanical system. For example, the changes, described first hereinbefore, in the impulse transfer between the gas and surface may lead to an interaction between two areas of different temperature lying opposite each other, which is mediated by the gas in between. Forces that bring about deflections of the movable structure may thus arise in particular between at least one of the areas of the movable structure and an area of a non-movable structure, i.e., one securely connected to the substrate. Such a non-movable structure may for example be formed by a substrate-mounted electrode arrangement or an inner wall of a cavity. The arrangement of the temperature measurement points and the position of the thermal element is preferably selected such that these specific relationships are taken into account. The geometric description is based in the following on the main plane of extent of the substrate, to which the movable structure is mechanically connected. Directions parallel to the main plane of extent are referred to as horizontal directions and the direction running perpendicularly to the main plane of extent is referred to as the vertical direction. The mutual position of the individual elements is designated by the terms "above" and "below". For taking vertical temperature gradients into account, the first temperature measurement point may for example be arranged above the movable structure, whereas the second temperature measurement point is arranged below the movable structure. To produce a vertical temperature gradient, the thermal element may be arranged for example above or below the movable structure, or the sensor may have a first thermal element above and a second thermal element below the movable structure. For horizontal temperature gradients, the movable structure may for example be arranged with respect to a horizontal direction between the first and second temperature measurement points. The thermal element may accordingly be spaced apart from the movable mass in a horizontal direction.

According to one specific embodiment of the method according to the present invention, in the balancing step a plurality of different temperature gradients are produced by the thermal element, with, for each temperature gradient, an associated deflection and temperatures at the first and second temperature measurement points being determined, the compensation value being ascertained dependent on the temperatures and deflections. To this end, the balancing step is repeated at least once, preferably several times, and upon each repetition a changed temperature gradient is produced and the associated deflection measured. For example, to this end the thermal element may continuously give off heat and in this way over time produce a steeper and steeper gradient. Conversely, the thermal element may also be deactivated, so that the temperature imbalance between the various regions over time relaxes due to the thermal conduction and the temperature gradient reduces more and more greatly. Due to the data set formed from the temperatures at the first and second temperature measurement points and the associated deflections, a functional dependency between deflection and temperature gradient can be ascertained by approximation (for example curve fitting) or the data set may itself be used for correction. Preferably, the compensation value or the compensation values to this end is/are stored in a storage element of the sensor, in particular in a register, and retrieved from the storage element in the compensation step.

One further subject of the present invention is a method for temperature compensation of a microelectromechanical sensor. This method, compared with the related art, has the advantage that the thermal influence causing the measuring error is minimized and the measurement of the physical stimulus can take place without or with a considerably reduced measuring error. The basic idea here is to make the temperature gradient occurring in the sensor vanish, or at least minimize it, by temperature regulation. The possible configurations described above apply analogously for the spatial arrangement of the thermal element and the temperature measurement points. In particular, in the event that the temperature gradient occurs first and foremost due to the heating of the printed circuit board (i.e., from underneath), the thermal element can be arranged above the movable structure, so that the vertically running temperature drop is counteracted. The measurement of the physical stimulus takes place in particular with a minimal temperature difference. The sensor requires substantially the same components, in particular the thermal element and two temperature measurement elements at the temperature measurement points, both for determining the compensation value and for regulating the temperature gradient. In this way, the sensor can be formed in particular such that both methods can be performed. Parameter-dependent combinations of both methods, or dynamic switchover operations between the two methods, are also conceivable.

There are two preferred application schemes for the correction of the measured value and the reduction of the temperature gradient: for sensors that are optimized for low power consumption, for example for use in smartphones, internal calibration of the sensor takes place preferably prior to delivery to the end user. The temperature gradient is produced in a controlled manner, the sensor behavior is detected and the sensor-specific calibration values are determined. The end user uses the corresponding sensor structures thereafter only for determining the temperature gradient present during operation, and the measured values are corrected with the aid of the compensation value. For sensors that are optimized for high accuracy, for example for use in vehicles, on the other hand, it is beneficial to measure the temperature gradient during operation and to compensate for it actively and continuously by regulating the thermal element, in order to obtain measured values that are as accurate as possible.

According to one preferred specific example embodiment of the present invention, in an additional balancing step the temperature of the entire sensor is increased by the thermal element to at least one temperature value, preferably a plurality of temperature values, and for each temperature value the physical stimulus is measured by way of the deflection of the movable structure, with a temperature dependency of an offset of the sensor and/or of a sensitivity of the sensor being ascertained dependent on the temperature values and the associated deflections. With this variant, the sensor structures can not only be used for controlled production or regulation of a temperature gradient, but can also be operated such that the sensor in its entirety is brought to one or two temperatures in order to extract the temperature dependency of the TCO (temperature coefficient of offset) and/or of the TCS (temperature coefficient of sensitivity) of the sensor. The measured TCO or TCS can then in turn be used in order, together with a continuous temperature measurement, to achieve compensation of the measuring error caused by the thermal influences.

The technical object mentioned first hereinbefore is furthermore achieved by a microelectromechanical sensor in accordance with the present invention. The advantages and possible configurations described in relation to the methods are transferred directly to the sensor according to the present invention, and vice versa. In particular, the evaluation unit is configured to ascertain the compensation value, dependent on the first and second temperature and the deflection, and to ascertain the measured value of the physical stimulus dependent on the measured deflection, the third and fourth temperature, and the compensation value. Alternatively or additionally, the evaluation unit is configured in particular for regulating the temperature increase. The first and second temperature measurement elements are arranged at the first or second temperature measurement point respectively and configured for determining the respective temperature. The evaluation unit is in particular an application-specific integrated circuit (ASIC), which may be arranged for example below the movable structure. Preferably the ASIC has the thermal element and/or the first temperature measurement element and/or the second temperature measurement element.

According to one preferred example configuration of the present invention, the sensor has a first and a second partial element, the first and second partial elements being connected together and the movable structure being arranged in a cavity formed between the first and second partial elements. The two partial elements in this case each have a substrate, the movable structure being connected mechanically to the substrate of the first partial element. The second partial element has in particular a micromechanical structure that functions as a cap for the micromechanical structure of the first partial element. The connection between the two partial elements may be formed in particular by a bonding method. The cavity formed between the two partial elements is filled with gas that is at a pressure that in particular is reduced relative to the normal pressure.

One structural form that is particularly sensitive to the forces caused by temperature gradients is Z-acceleration sensors, the movable mass of which is configured to detect accelerations in the vertical direction applied to the sensor. Such acceleration sensors are usually realized as a rocker with an asymmetrical mass distribution, the deflection of which is measured capacitively by way of electrode arrangements. The methods according to the present invention are particularly well suited for compensating for such capacitive MEMS-Z sensors.

According to one preferred example configuration in accordance with the present invention, the movable structure is an asymmetrical rocker structure having a first and a second rocker arm, the rocker structure being mounted rotatably about an axis of rotation and the first and second rocker arms being formed asymmetrically to each other with respect to the axis of rotation. In particular, the first and second rocker arms are formed differently in order to produce an asymmetrical mass distribution that in the case of an acceleration applied from the outside causes rotation of the rocker. For example, the rocker arms may have different dimensions or differently shaped cutouts (perforations). In the simplest case, it is a mass suspended asymmetrically from a torsion spring, the deflection of which mass is measured capacitively in relation to two counter-electrodes anchored securely to the substrate. A vertical temperature gradient, owing to the asymmetry of the mass, brings about forces of different strengths on the two rocker sides and in this way causes a deflection. The effect can be reduced to a certain degree by way of additional layers and suitable geometric adaptations, but can never be entirely avoided. Due to the methods according to the present invention, it is on the other hand possible to compensate for the resulting measuring error or to reduce the temperature gradient itself.

According to one preferred example configuration of the present invention, the thermal element is a resistance element arranged in the first partial region, the resistance element being configured to give off ohmic heat to the first partial region, the evaluation unit being configured to determine the first and third temperature by way of an electric resistance measurement of the resistance element. In this way, it is advantageously possible, by the resistance element, both to produce the temperature gradient and to determine the temperature by way of the temperature-dependent change in the electrical resistance. The resistance element may be arranged for example on the substrate, with a second temperature measurement element being provided at at least one second temperature measurement point spaced apart vertically from the resistance element, for example on the switching-circuit silicon usually lying thereunder.

According to one preferred example configuration of the present invention, the evaluation unit comprises at least one CMOS structure, the CMOS structure having at least one temperature measurement element. The abbreviation CMOS here stands for "complementary metal oxide semiconductor". In one particularly beneficial arrangement, it is proposed to provide on the substrate of one of the two partial elements, on a side facing the movable structure, both a temperature measurement element and CMOS circuit elements for evaluating the signals of the MEMS component. What is beneficial about such an arrangement is that in a standard CMOS process temperature measurement elements, the lateral positioning of which can furthermore take place very accurately, can be realized usually without additional expenditure. Furthermore, the temperature measurement elements can be measured very accurately, since lines to the measuring elements can be designed to be very short and in a defined manner owing to their integration in the CMOS circuit. Because of the integration, a very large number of measuring elements can also be integrated on the CMOS circuit in order to achieve as accurate compensation as possible.

According to one preferred example configuration of the present invention, the thermal element is arranged in a vertical direction above the movable structure, the movable structure being formed from a first function layer of the sensor and the thermal element being formed from a second function layer of the sensor, the thermal element and the movable structure being connected mechanically to a common substrate in each case by way of anchoring means. MEMS production processes that have two function layers (MEMS layers or MEMS planes) that lie one above another and can be freely coupled are known from the prior art. In the second MEMS layer, in this specific embodiment a structure is formed that is configured both to bring about a change in temperature and to measure the temperature. This thermal element is positioned in particular in a free-floating manner over a partial region of the movable structure that in this region is formed only in the first MEMS plane. The thermal element formed in the second layer may be anchored on the MEMS substrate in an edge region or by way of a cutout in the movable structure. At the same time, an additional thermal element for changing the temperature and/or measuring the temperature may be arranged below a partial region of the movable structure. In one particularly beneficial arrangement, the thermal elements arranged above and below the movable structure span the same partial region and are arranged symmetrically to each other. Furthermore, it is beneficial, in the case of a movable structure that can perform a rotary movement about a horizontally running axis of rotation, to provide in each case two pairs of thermal elements lying above and below that are arranged symmetrically to each other with respect to the axis of rotation.

Example embodiments of the present invention are illustrated in the figure and discussed in greater detail in the following description.

DETAILED DESCRIPTION OF EXAMPLE EMBODIMENTS

Figure 1A:
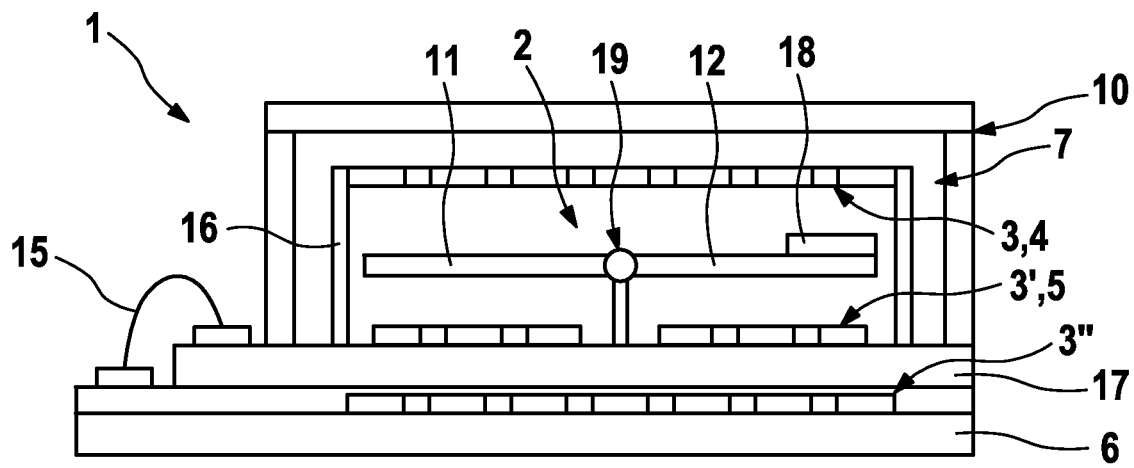
FIG. 1A shows a specific example embodiment of the sensor according to the present invention.

FIG. 1 illustrates one specific embodiment of the sensor 1 according to the present invention, which is formed by a microelectromechanical structure that is arranged on a substrate 17. Below the substrate 17 there is arranged an ASIC 6 that is connected to the MEMS structure by way of a bonding wire connection 15. The MEMS structure comprises a movable structure 2 that here is formed as a rocker 2 suspended from a torsion spring 19. The rocker 2 consists of two rocker arms 11, 12, and has an additional mass 18 on the right-hand rocker arm 12, so that under a vertical acceleration applied from the outside, owing to the asymmetrical mass distribution, a torque is produced that brings about a deflection of the rocker 2 by way of which the external acceleration can be detected (Z-acceleration sensor). The movable structure 2 is arranged in a cavity 7 formed by a cap 10, in order to create a defined gas atmosphere that serves to damp the movements of the rocker 2.

If a temperature gradient is then applied to the sensor 1, as is caused for example by heat transfer from a printed circuit board lying under the sensor 1, a deflection of the movable structure 2 results even without external acceleration, solely due to the temperature gradient. This effect comes about substantially in that the impulse transfer of a particle striking an area depends on the temperature difference between the area and the gas, and the gas in the event of such a temperature difference thus exerts a slightly increased or reduced pressure on the area. In a perfectly symmetrical structure, the gas particles would exert forces of the same size on both rocker arms 11. Since, however, the two rocker sides 11, 12 are perforated differently for the etching process necessary to form the rocker 2, an asymmetrical moment that turns the structure 2 results.

In order to reduce or compensate for this measuring error, the sensor 1 according to the present invention has the following further structures: within the cavity 7, there are in this example two heating resistors 3, 3', which by way of a measurement of the electrical resistance also function simultaneously as temperature measurement elements 4, 5. The upper heating structure 3 and the lower heating structure 3' in the MEMS cavity 7 can be actuated and evaluated separately. Usually the ASIC 6 responsible for the evaluation lies below the MEMS structure and in this example it also has "top structuring" with a heating structure 3". Since the latter in general is made of metal, this structure 3" is more suitable for generating heat, but less so for measuring the temperature. There are better measuring options in the corresponding ASIC processes for measuring temperature, such as using diodes.

Figure 1B:
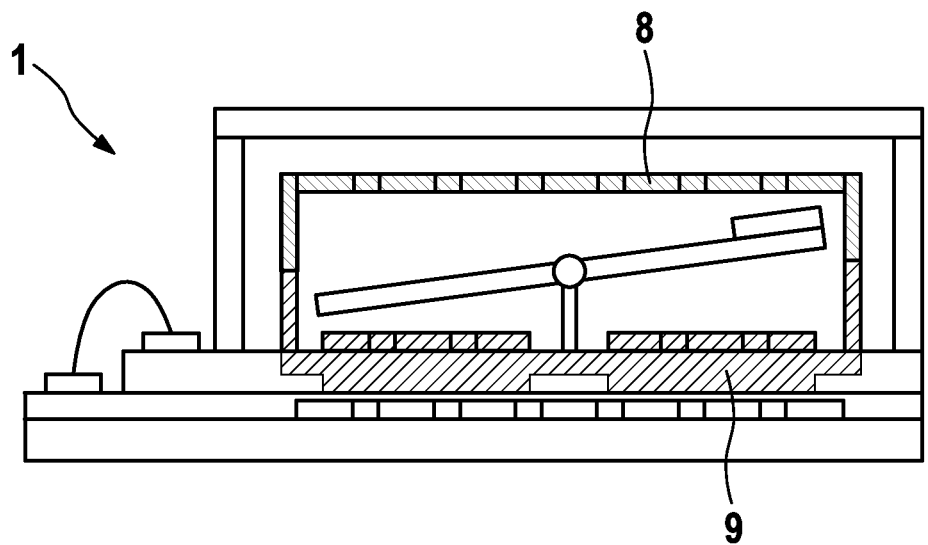
FIG. 1B illustrates the deflection caused by a temperature gradient.

According to the present invention, the procedure may now be, for example, as follows:

when calibrating the component 1, a temperature gradient is generated in a controlled manner by subjecting the structures 3, 3', 3" to a current so that the heating wires heat up and a first partial region 8 is at a different temperature than a second partial region 9 (indicated in FIG. 1b by different hatching).

once the thermal time constants permit temperature control of the component, the change in the signal (i.e. the deflection) is measured relative to the change in the resistance. Delta ACC-Z:=DAZ, Delta Temp gradient=DTG.

a compensation value K=−DAZ/DTG is calculated and programmed in the component for compensation, or alternatively made available to the end user in order to carry out the compensation outside the sensor 1.

the ASIC 6 can now accordingly, with a suitable frequency (in general, thermal time constants are in the region of a few Hz), determine the gradient and calculate the updated values with K and add them to the digital acceleration value.

a compensated value is then available at the output.

The influence of the temperature gradient can also be treated differently with the heating structure. For the example, the ASIC 6 is in direct contact with the printed circuit board (PCB) underneath, i.e. heating always takes place from underneath. The heating structure above the MEMS can now be heated in order to bring the gradient to zero in a control loop, and thus to remove or reduce the temperature gradient.

Figure 2:
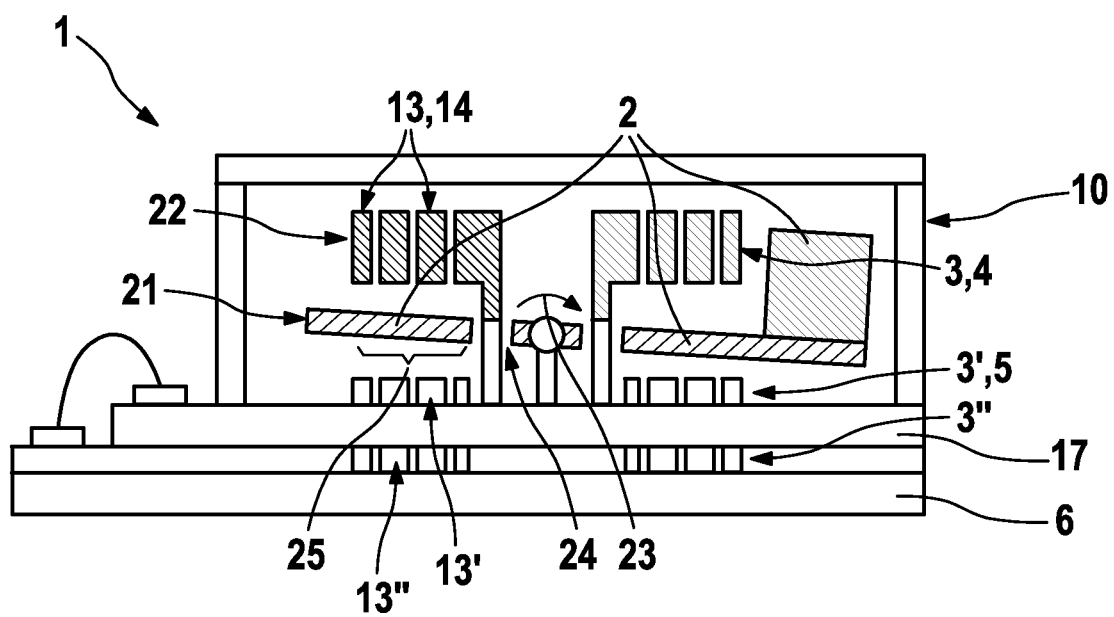
FIG. 2 shows a further specific example embodiment of the sensor according to the present invention.

In FIG. 2, a particularly beneficial arrangement for MEMS components with two freely adjustable MEMS planes 21, 22 that lie one above another is proposed (the planes 21, 22 are marked by hatching). Such MEMS layers 21, 22 that lie one above another and can be freely coupled can be realized using MEMS production processes known from the prior art. A structure 3, 13 is proposed that is formed in the second MEMS layer 22 and is arranged in a free-floating manner above a partial region 25 of a movable structure 2. The movable structure 2 in this region is formed only in the first MEMS plane 21. This element 3, 13 can be anchored to the MEMS substrate 17 in an edge region or by way of a cutout 24 in the movable structure 2. At the same time, a heating and measuring element 3', 13' can be arranged below a partial region of the movable structure 2. In one particularly beneficial arrangement, the heating and measurement elements 3, 13, 3', 13' arranged above and below the movable structure 2 span the same partial region and are arranged symmetrically to each other. In the case of a movable structure 2 that can perform a rotary movement 23 about an axis lying parallel to the substrate surface, it is in addition beneficial to use in each case two pairs 3, 13 or 3', 13' of heating and measuring elements located above and below, which are arranged symmetrically to each other with respect to the axis of rotation. In a similar way, such a pair 3", 13" of heating elements may be provided as part of the ASIC 6.

What is claimed is:

1. A method for temperature compensation of a microelectromechanical sensor, the sensor having a movable structure configured to measure a physical stimulus, the method comprising:
    producing, in a balancing step, a temperature gradient by at least one thermal element so that a first and second partial region of the sensor are at different temperatures, wherein a first temperature is determined at a first temperature measurement point arranged in the first partial region and a second temperature is determined at a second temperature measurement point arranged in the second partial region, and wherein a deflection of the movable structure produced by the temperature gradient is measured, so as to provide a measured deflection, and a compensation value is determined dependent on the first and second temperature and the deflection;
    measuring, in a measurement step, the physical stimulus using the deflection of the movable structure, wherein a third temperature is determined at the first temperature measurement point and a fourth temperature is determined at the second temperature measurement point; and
    ascertaining, in a compensation step, a measured value of the physical stimulus dependent on the measured deflection, the third and fourth temperatures, and the compensation value;
    wherein the deflection caused by the temperature gradient is measured only when a stable temperature profile is obtained, wherein the measurement of the deflection takes place with a time delay relative to activation of the thermal element, and wherein the first and second temperature measurement points are monitored and the measurement of the deflection takes place only when the first and second temperatures have assumed a stable value, and
    wherein to separate the deflection brought about by the physical stimulus from a thermal influence of the temperature gradient, the third and fourth temperatures in the two measurement points are determined simultaneously together with the deflection, and wherein together with the third and fourth temperatures, the corrected measured value of the physical stimulus are ascertained from the compensation value, which quantifies the thermal influence of the temperature gradient.

2. The method as recited in claim 1, wherein in the balancing step, a plurality of different temperature gradients are produced by the thermal element, with, for each temperature gradient, an associated deflection and temperatures at the first and second temperature measurement points being determined, the compensation value being ascertained dependent on the temperatures and deflections.

3. The method as recited in claim 1, further comprising:
    increasing, in an additional balancing step, the temperature of the entire sensor by the thermal element to a plurality of temperature values, and for each temperature value, the physical stimulus is measured using the deflection of the movable structure, wherein a temperature dependency of an offset of the sensor, and/or of a sensitivity of the sensor is ascertained dependent on the temperature values and the deflections.

4. A method for temperature compensation of a microelectromechanical sensor, the sensor having a movable structure for measuring a physical stimulus, the method comprising:
    determining, in a regulation step, a temperature difference between a first and a second temperature measurement point, the first and second temperature measurement points being spaced apart from one another, a local temperature increase within the sensor being brought about by at least one thermal element, regulation of the temperature increase taking place so that the temperature difference between the first and second temperature measurement points is minimized; and
    measuring, in a measurement step, the physical stimulus using a deflection, so as to provide a measured deflection, of the movable structure;
    wherein the deflection caused by the temperature gradient is measured only when a stable temperature profile is obtained, wherein the measurement of the deflection takes place with a time delay relative to activation of the thermal element, and wherein the first and second temperature measurement points are monitored and the measurement of the deflection takes place only when the first and second temperatures have assumed a stable value, and
    wherein to separate the deflection brought about by the physical stimulus from a thermal influence of the temperature gradient, the third and fourth temperatures in the two measurement points are determined simultaneously together with the deflection, and wherein together with the third and fourth temperatures, the corrected measured value of the physical stimulus are ascertained from the compensation value, which quantifies the thermal influence of the temperature gradient.

5. A microelectromechanical sensor, comprising:
    a movable structure;
    at least one thermal element;
    two temperature measurement elements; and
    an evaluation unit;
    wherein the movable structure is configured to measure a physical stimulus, and the sensor is configured to perform the following:
        produce a temperature gradient by at least one thermal element so that a first and second partial region of the sensor are at different temperatures, wherein a first temperature is determined at a first temperature measurement point arranged in the first partial region and a second temperature is determined at a second temperature measurement point arranged in the second partial region, and wherein a deflection of the movable structure produced by the temperature gradient is measured, so as to provide a measured deflection, and a compensation value is determined dependent on the first and second temperature and the deflection, measure the physical stimulus using the deflection of the movable structure, wherein a third temperature is determined at the first temperature measurement point and a fourth temperature is determined at the second temperature measurement point, and ascertain a measured value of the physical stimulus dependent on the measured deflection, the third and fourth temperatures, and the compensation value;

wherein the deflection caused by the temperature gradient is measured only when a stable temperature profile is obtained, wherein the measurement of the deflection takes place with a time delay relative to activation of the thermal element, and wherein the first and second temperature measurement points are monitored and the measurement of the deflection takes place only when the first and second temperatures have assumed a stable value, and wherein to separate the deflection brought about by the physical stimulus from a thermal influence of the temperature gradient, the third and fourth temperatures in the two measurement points are determined simultaneously together with the deflection, and wherein together with the third and fourth temperatures, the corrected measured value of the physical stimulus are ascertained from the compensation value, which quantifies the thermal influence of the temperature gradient.

6. The sensor as recited in claim 5, wherein the sensor has a first and a second partial element, the first and second partial elements being connected together and the movable structure being arranged in a cavity formed between the first and second partial elements, wherein the first and second partial elements include an upper heating structure and a lower heating structure.

7. The sensor as recited in claim 6, wherein the thermal element is a resistance element arranged in the first partial region, the resistance element being configured to give off ohmic heat to the first partial region, the evaluation unit being configured to determine the first and third temperature using an electric resistance measurement of the resistance element.

8. The sensor as recited in claim 5, wherein the movable structure is an asymmetrical rocker structure having a first and a second rocker arm, the rocker structure being mounted rotatably about an axis of rotation and the first and second rocker arms being formed asymmetrically to each other with respect to the axis of rotation.

9. The sensor as recited in claim 5, wherein the evaluation unit includes at least one CMOS structure, the CMOS structure having at least one temperature measurement element.

10. The sensor as recited in claim 5, wherein the thermal element is arranged in a vertical direction above the movable structure, the movable structure being formed from a first function layer of the sensor and the thermal element being formed from a second function layer of the sensor, each of the thermal element and the movable structure being connected mechanically to a common substrate using an anchor.

11. A microelectromechanical sensor, comprising:
a movable structure;
at least one thermal element;
two temperature measurement elements; and
an evaluation unit;
wherein the movable structure is configured to measure a physical stimulus, and the sensor is configured to perform the following:

determining a temperature difference between a first and a second temperature measurement point, the first and second temperature measurement points being spaced apart from one another, a local temperature increase within the sensor being brought about by at least one thermal element, regulation of the temperature increase taking place so that the temperature difference between the first and second temperature measurement points is minimized; and measuring the physical stimulus using a deflection, so as to provide a measured deflection, of the movable structure;

wherein the deflection caused by the temperature gradient is measured only when a stable temperature profile is obtained, wherein the measurement of the deflection takes place with a time delay relative to activation of the thermal element, and wherein the first and second temperature measurement points are monitored and the measurement of the deflection takes place only when the first and second temperatures have assumed a stable value, and wherein to separate the deflection brought about by the physical stimulus from a thermal influence of the temperature gradient, the third and fourth temperatures in the two measurement points are determined simultaneously together with the deflection, and wherein together with the third and fourth temperatures, the corrected measured value of the physical stimulus are ascertained from the compensation value, which quantifies the thermal influence of the temperature gradient.

12. The sensor as recited in claim 11, wherein the sensor has a first and a second partial element, the first and second partial elements being connected together and the movable structure being arranged in a cavity formed between the first and second partial elements, wherein the first and second partial elements include an upper heating structure and a lower heating structure.

13. The sensor as recited in claim 11, wherein the movable structure is an asymmetrical rocker structure having a first and a second rocker arm, the rocker structure being mounted rotatably about an axis of rotation and the first and second rocker arms being formed asymmetrically to each other with respect to the axis of rotation.

14. The sensor as recited in claim 11, wherein the evaluation unit includes at least one CMOS structure, the CMOS structure having at least one temperature measurement element.

15. The sensor as recited in claim 11, wherein the thermal element is arranged in a vertical direction above the movable structure, the movable structure being formed from a first function layer of the sensor and the thermal element being formed from a second function layer of the sensor, each of the thermal element and the movable structure being connected mechanically to a common substrate using an anchor.

* * * * *